US012655289B2

United States Patent
(12) United States Patent
Ko et al.

(10) Patent No.: US 12,655,289 B2
(45) Date of Patent: Jun. 16, 2026

(54) POLYESTER RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Gun Ko, Daejeon (KR); Seonho Kong, Daejeon (KR); Sun Mo Son, Daejeon (KR); Hyun Seok Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 497 days.

(21) Appl. No.: 18/266,371

(22) PCT Filed: Dec. 23, 2022

(86) PCT No.: PCT/KR2022/021163
§ 371 (c)(1),
(2) Date: Jun. 9, 2023

(87) PCT Pub. No.: WO2023/229132
PCT Pub. Date: Nov. 30, 2023

(65) Prior Publication Data

US 2024/0317991 A1 Sep. 26, 2024

(30) Foreign Application Priority Data

May 25, 2022 (KR) ........................ 10-2022-0063834

(51) Int. Cl.
*C08J 5/04* (2006.01)
*C08K 7/14* (2006.01)
*C08L 67/02* (2006.01)

(52) U.S. Cl.
CPC ............... *C08L 67/02* (2013.01); *C08J 5/043* (2013.01); *C08K 7/14* (2013.01); *C08L 2205/025* (2013.01); *C08L 2207/20* (2013.01)

(58) Field of Classification Search
CPC ....... C08L 67/02; C08L 2207/20; C08K 7/14; C08J 5/043
USPC ........................................................ 524/492
See application file for complete search history.

(56) References Cited

U.S. PATENT DOCUMENTS

2022/0186021 A1 6/2022 Hofmann et al.

FOREIGN PATENT DOCUMENTS

| | | |
|---|---|---|
| CA | 2079963 A1 | 4/1993 |
| CN | 103834148 A | 6/2014 |
| CN | 112552657 | 3/2021 |
| CN | 113402856 | 9/2021 |
| CN | 116096813 A | 5/2023 |

(Continued)

OTHER PUBLICATIONS

Vu-Khanh et al., "The Effects of Injection Molding on the Mechanical Behavior of Long-Fiber Blends," Composites Science and Technology, 40:423-435 (1991).

*Primary Examiner* — Ruiyun Zhang
(74) *Attorney, Agent, or Firm* — Bryan Cave Leighton Paisner LLP

(57) ABSTRACT

Provided is a polyester resin composition and a molded article manufactured using the same. The polyester resin composition can provide mechanical properties, particularly injection properties, similar to those of inexpensive PBT materials and satisfy both eco-friendliness and heat resistance. Due to these advantages, the polyester resin composition can be applied to a motor insulator part used inside a refrigerator that requires excellent dimensional stability, heat resistance, and injection properties.

19 Claims, 2 Drawing Sheets

(56) References Cited

FOREIGN PATENT DOCUMENTS

| | | | |
|---|---|---|---|
| CN | 116323806 | A | 6/2023 |
| CN | 116829645 | A | 9/2023 |
| CN | 117098808 | A | 11/2023 |
| EP | 4299671 | A1 | 1/2024 |
| JP | 2000-044784 | | 2/2000 |
| JP | 2010-208190 | | 9/2010 |
| JP | 2019-147934 | | 9/2019 |
| KR | 10-2019-0027115 | | 3/2019 |
| KR | 10-2019-0027115 | A | 3/2019 |
| KR | 10-2022-0007670 | | 1/2022 |
| WO | 2019-034368 | | 2/2019 |
| WO | 2024043533 | A1 | 2/2024 |
| WO | 2024071585 | A1 | 4/2024 |

[FIG. 1]
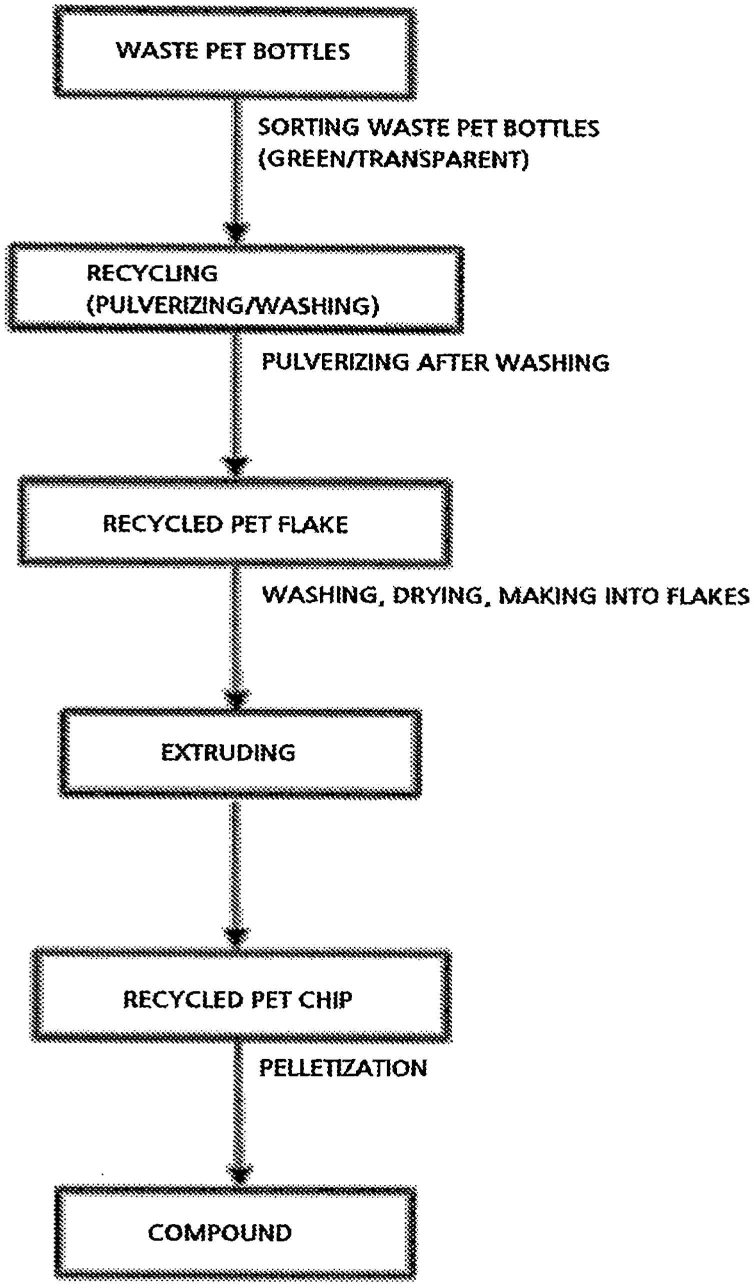

[FIG. 2]
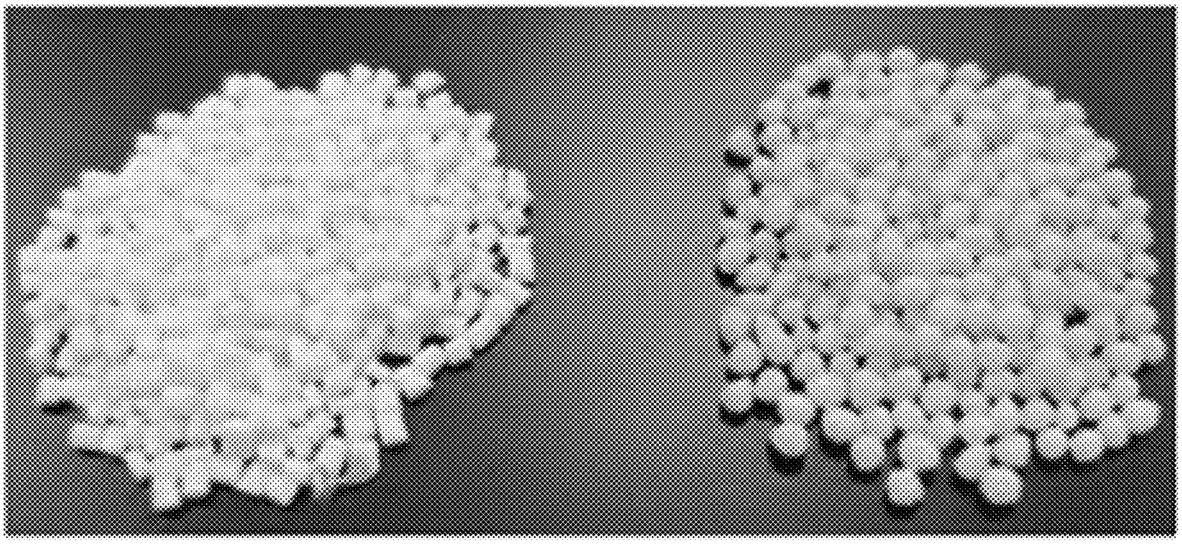

POLYESTER RESIN COMPOSITION, METHOD OF PREPARING THE SAME, AND MOLDED ARTICLE MANUFACTURED USING THE SAME

CROSS-REFERENCE TO RELATED APPLICATION

This application is a National Stage Application of International Application No. PCT/KR2022/021163 filed on May 25, 2022, which claims priority to Korean Patent Application No. 10-2022-0063834, filed on May 25, 2022, in the Korean Intellectual Property Office, the disclosure of which is incorporated herein by reference.

TECHNICAL FIELD

The present invention relates to a polyester resin composition, a method of preparing the same, and a molded article manufactured using the same. More particularly, the present invention relates to a polyester resin composition having excellent mechanical properties, particularly excellent injection properties, and satisfying both eco-friendliness and heat resistance although the polyester resin composition includes an inexpensive PBT material; and a molded article including the polyester resin composition. Due to these characteristics, the polyester resin composition and the molded article are applicable to motor insulator parts for internal use.

BACKGROUND

Polybutylene terephthalate resin (hereinafter referred to as "PBT") has excellent mechanical and electrical properties and excellent physical and chemical properties, and is applied to various fields such as automobiles, electrical and electronic devices, and office equipment.

Since PBT is inexpensive and the physical properties thereof can be easily controlled, PBT is applied to various injection molding processes. To improve the physical properties of PBT, a reinforced resin composition prepared by adding an inorganic filler such as glass fiber, carbon fiber, talc, or clay to PBT is widely used. However, in the case of using a reinforcing material composed of the inorganic filler, when the reinforcing material is not included in a large amount, mechanical properties or heat resistance can not be improved, or increase in the mass of a prepared resin composition due to high specific gravity can cause problems.

Various plastic products manufactured using polyethylene terephthalate resin (hereinafter referred to as "PET") are discarded after being used. Recently, a method of using such waste plastic is attracting attention.

Like PBT, PET is classified as a polyester resin. However, since PET has a higher crystallization temperature than PBT, PET has poor moldability and relatively unstable mechanical properties such as dimensional change.

Accordingly, when PET is added, it is not easy to control physical properties compared to a reinforced resin composition prepared by adding an inorganic filler such as glass fiber to conventional PBT. Thus, development of technology capable of solving these problems is required.

On the other hand, techniques for preparing polyester resin by recycling mineral water bottles are being studied. Currently, about 2.5 billion PET bottles (100,000 tons) are used and discarded. However, there are only a few ways to recycle waste PET bottles. For example, recycling of waste PET bottles includes reusing PET bottles as beverage bottles and reusing PET bottles as fiber or packaging materials.

Therefore, when a composition having excellent mechanical properties such as heat resistance, injection properties, and dimensional stability is prepared using waste mineral water bottles, environmental pollution can be prevented.

RELATED ART DOCUMENTS

Patent Documents

KR 2019-027115 A

BRIEF DESCRIPTION

Technical Problem

Therefore, the present invention has been made in view of the above problems, and it is one object of the present invention to provide a polyester resin composition having excellent mechanical properties, particularly excellent injection properties, and satisfying both eco-friendliness and heat resistance although the polyester resin composition includes an inexpensive PBT material. Due to these characteristics, the polyester resin composition is applicable to motor insulator parts for internal use.

It is another object of the present invention to provide a method of preparing the polyester resin composition.

It is yet another object of the present invention to provide a molded article manufactured using the polyester resin composition.

The above and other objects can be accomplished by the present invention described below.

Technical Solution

In accordance with one aspect of the present invention, provided is a polyester resin composition, including:

26.7 to 54% by weight of a polybutylene terephthalate resin;

10 to 37.5% by weight of a polyethylene terephthalate resin; and 10 to 43% by weight of glass fiber, wherein the glass fiber includes calcium oxide in an amount of 35.6 to 60% by weight or 13 to 24% by weight.

A weight ratio (PBT:PET) of the polybutylene terephthalate resin (PBT) to the polyethylene terephthalate resin (PET) can be 1:0.7 to 1:3.

The polyethylene terephthalate resin can be a resin obtained by processing mineral water bottles.

The resin obtained by processing mineral water bottles can be obtained by subjecting waste mineral water bottle pellets to flake processing and chip molding.

The resin obtained by processing waste mineral water bottles can be a recycled resin obtained through flake processing.

The polyethylene terephthalate resin can have an intrinsic viscosity of 0.5 to 1.0 as measured according to ASTM D2857.

The polybutylene terephthalate resin can have an intrinsic viscosity of 0.6 to 1.8 as measured according to ASTM D2857.

Based on 100% by weight in total of the components constituting the composition, the glass fiber including 35.6 to 60% by weight of calcium oxide can be included in an amount of 10 to 31% by weight.

Based on 100% by weight in total of the components constituting the composition, the glass fiber including 13 to 24% by weight of calcium oxide can be included in an amount of 15 to 35% by weight.

Based on 100% by weight in total of the components constituting the composition, the polyester resin composition can include one or more additives selected from the group consisting of a lubricant, a transesterification inhibitor, an antioxidant, a heat stabilizer, a flame retardant, a flame retardant aid, a colorant, a release agent, a pigment, a dye, an antistatic agent, an antibacterial agent, a processing aid, a metal deactivator, a smoke suppressant, a fluorine-based anti-drip agent, an anti-friction agent, an anti-wear agent, and a coupling agent in an amount of 0.1 to 10% by weight.

The polyester resin composition can be a polyester resin composition for a motor insulator for internal use.

The polyester resin composition can have a flexural strength of 1,700 kgf/cm$^2$ or more, and a flexural modulus of 70, 000 kgf/cm$^2$ or more as measured at a span of 50 and a speed of 1.3 mm/min using a ⅛-inch molded article specimen according to ASTM D790.

The polyester resin composition can have an Izod impact strength of 7.0 kgf·cm/cm or more as measured at 23° C. using a notched specimen according to ASTM D256, and can have a heat deflection temperature of 200° C. or higher as measured under a load of 18.6 kg according to ASTM D648.

In accordance with another aspect of the present invention, provided is a polyester resin composition, including:

26.7 to 54% by weight of a polybutylene terephthalate resin;

10 to 37.5% by weight of a recycled resin; and 10 to 43% by weight of glass fiber, wherein the glass fiber includes calcium oxide in an amount of 35.6 to 60% by weight or 13 to 24% by weight.

The recycled resin can be obtained by subjecting waste polyester mineral water bottle pellets having an intrinsic viscosity of 0.5 to 1.0 dl/g to chip molding.

In accordance with still another aspect of the present invention, provided is a method of preparing a polyester resin composition, including:

melt-kneading and extruding 26.7 to 54% by weight of a polybutylene terephthalate resin, 10 to 37.5% by weight of a polyethylene terephthalate resin, and 10 to 43% by weight of glass fiber, wherein the glass fiber includes calcium oxide in an amount of 35.6 to 60% by weight or 13 to 24% by weight.

Based on 100% by weight in total of the components constituting the composition, the glass fiber including 35.6 to 60% by weight of calcium oxide can be included in an amount of 10 to 31% by weight.

Based on 100% by weight in total of the components constituting the composition, the glass fiber including 13 to 24% by weight of calcium oxide can be included in an amount of 15 to 35% by weight.

In accordance with still another aspect of the present invention, provided is a method of preparing a polyester resin composition, including:

obtaining waste mineral water bottle pellets by subjecting waste polyester mineral water bottles having an intrinsic viscosity of 0.5 to 1.0 dl/g to flake processing and manufacturing a recycled molded article by subjecting the obtained waste mineral water bottle pellets to chip molding; and melt-kneading and extruding 10 to 37.5% by weight of the recycled molded article, 26.7 to 54% by weight of a polybutylene terephthalate resin, and 10 to 43% by weight of glass fiber, wherein the glass fiber includes calcium oxide in an amount of 35.6 to 60% by weight or 13 to 24% by weight.

Based on 100% by weight in total of the components constituting the composition, the glass fiber including 35.6 to 60% by weight of calcium oxide can be included in an amount of 10 to 31% by weight.

Based on 100% by weight in total of the components constituting the composition, the glass fiber including 13 to 24% by weight of calcium oxide can be included in an amount of 15 to 35% by weight.

The recycled molded article can be manufactured by sorting waste mineral water bottles made of polyethylene terephthalate having an intrinsic viscosity (IV) of 0.5 to 1.0 dl/g into colored bottles and transparent bottles, washing the bottles, pulverizing the bottles, washing and drying the pulverized bottles, performing flake processing, and then performing extrusion molding.

In accordance with yet another aspect of the present invention, provided is a molded article manufactured by molding the above-described polyester resin composition.

The molded article can be a motor insulator part for internal use.

Advantageous Effects

Although a polyester resin composition according to one embodiment of the present invention includes a thermoplastic resin composition reinforced with a polybutylene terephthalate resin; and a polyethylene terephthalate resin having a crystallization temperature higher than that of the polybutylene terephthalate resin and having relatively stable mechanical properties such as dimensional stability, the polyester resin composition can provide mechanical properties, particularly injection properties, similar to those of conventional materials and improve eco-friendliness and heat resistance.

Accordingly, the polyester resin composition and molded article according to the present invention can be applied to various internal parts. As a preferred example, the polyester resin composition and the molded article can be applied to a motor insulator part used inside a refrigerator that requires excellent heat resistance and moldability.

DESCRIPTION OF THE DRAWINGS

FIG. 1 is a process flowchart for explaining a process of manufacturing a recycled molded article of waste mineral water bottles used in an embodiment to be described later.

FIG. 2 includes an image (left) of a PET resin and an image (right) of a resin obtained by processing waste mineral water bottles according to the process shown in FIG. 1. Here, the PET resin refers to a virgin resin prepared by the DMT method.

Here, the DMT method refers to transesterification reaction of dimethyl terephthalate (DMT) and ethylene glycol (EG) known in the art.

DETAILED DESCRIPTION

Hereinafter, the present invention will be described in more detail to aid in understanding of the present invention.

The terms and words which are used in the present specification and the appended claims should not be construed as being confined to common meanings or dictionary meanings but should be construed as having meanings and concepts matching the technical spirit of the present invention in order to describe the present invention in the best fashion.

In the present invention, it is to be understood that, unless stated otherwise, when a part "comprises" any element, the part can include other elements without excluding other elements.

As used herein, the term "content" can refer to "% by weight", unless otherwise specified.

The present inventors conducted studies to develop a material for motor insulator parts used inside a refrigerator. As a result of such studies, the present inventors confirmed that, when a material reinforced with a polybutylene terephthalate resin was prepared, when a polyethylene terephthalate resin having relatively high crystallization temperature and unstable mechanical properties such as dimensional stability was included in a predetermined amount and the composition of the reinforced material was also adjusted, mechanical properties, particularly injection properties, similar to those of conventional materials could be provided, and both eco-friendliness and heat resistance were improved. Based on these results, the present inventors conducted further studies to complete the present invention.

According to one embodiment of the present invention, a polyester resin composition including a polybutylene terephthalate resin, a polyethylene terephthalate resin, and glass fiber can be provided.

By adjusting the weight ratio of the polybutylene terephthalate resin to the polyethylene terephthalate resin, the polyester resin composition according to one embodiment of the present invention can provide mechanical properties, particularly injection properties, similar to those of conventional materials and satisfy both eco-friendliness and heat resistance.

The polyester resin composition can further include a nucleating agent.

Hereinafter, each of the components constituting the polyester resin composition of the present invention is specifically described.

Polybutylene Terephthalate Resin

According to one embodiment of the present invention, the polyester resin composition includes a polybutylene terephthalate resin. As described above, by including the polybutylene terephthalate resin in the polyester resin composition, physical properties required for motor insulator parts for internal use can be implemented.

In one embodiment of the present invention, as the polybutylene terephthalate resin, a polybutylene terephthalate resin obtained by polycondensation of 1,4-butanediol and terephthalic acid or dimethyl terephthalate through direct esterification or transesterification can be used.

The polybutylene terephthalate resin (PBT) can have a repeat unit represented by Chemical Formula 1 below.

[Chemical Formula 1]

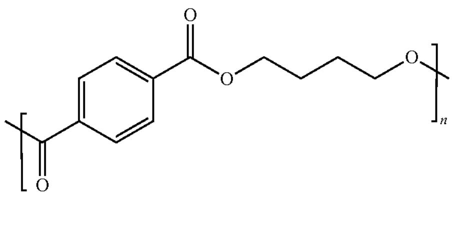

In Chemical Formula 1, n represents an average degree of polymerization ranging from 50 to 200.

In one embodiment of the present invention, to increase the impact strength of the polyester resin composition, a copolymer obtained by copolymerizing the polybutylene terephthalate resin and an impact improving compound such as polytetramethylene glycol, polyethylene glycol, polypropylene glycol, aliphatic polyester, or aliphatic polyamide or a modified polybutylene terephthalate resin obtained by mixing the polybutylene terephthalate resin and the impact improving compound can be used.

In one embodiment of the present invention, for example, the polybutylene terephthalate resin can have an intrinsic viscosity (η) of 0.6 dl/g to 1.8 dl/g, 0.7 dl/g to 1.3 dl/g, or 0.9 to 1.3 dl/g as measured according to ASTM D2857. When the intrinsic viscosity of the polybutylene terephthalate resin satisfies this range, a polyester resin composition having excellent physical property balance between mechanical properties and processability can be obtained.

The intrinsic viscosity (η) can be measured at 20° C. using a filtrate obtained by dissolving a sample in methylene chloride using an Ubbelohde-type viscometer.

For example, the polybutylene terephthalate resin can have a weight average molecular weight of 10,000 to 80,000 g/mol, 20,000 g/mol to 100,000 g/mol, 30,000 g/mol to 90,000 g/mol, 40,000 g/mol to 80,000 g/mol, or 50,000 g/mol to 70,000 g/mol. Within this range, mechanical properties can be improved.

When measuring weight average molecular weight, a sample having a concentration of 1 wt % is prepared by putting tetrahydrofuran (THF) and a compound in a 1 ml glass bottle. Then, after filtering a standard sample (polystyrene) and the sample through a filter (pore size: 0.45 μm), the filtered samples are injected into a GPC injector. Then, the molecular weight and molecular weight distribution of the compound can be obtained by comparing the elution time of the sample with the calibration curve of the standard sample. At this time, Infinity II 1260 (Agilient Co.) can be used as measuring instrument, and flow rate can be set to 1.00 mL/min and column temperature can be set to 40.0° C.

In one embodiment of the present invention, for example, based on 100% by weight in total of the components constituting the composition, the polybutylene terephthalate resin can be included in an amount of 26.7 to 54% by weight, 27 to 50% by weight, 27 to 30 by weight, 30 to 54% by weight, or 30 to 49% by weight. When the polybutylene terephthalate resin is included in an amount less than the range, problems such as increase in cycle time can occur due to decrease in solidification rate during injection molding. When the polybutylene terephthalate resin is included in an amount exceeding the range, injection properties can be poor.

As a method of preparing the polybutylene terephthalate resin, a polymerization method commonly practiced in the art to which the present invention pertains can be used without particular limitation. When a commercially available polybutylene terephthalate resin meets the definition of polybutylene terephthalate resin according to the present invention, the commercially available polybutylene terephthalate resin can be used in the present invention.

Polyethylene Terephthalate Resin

According to one embodiment of the present invention, the polyester resin composition includes a polyethylene terephthalate resin. As described above, by including the polyethylene terephthalate resin in the polyester resin composition, physical properties required for motor insulator parts for internal use can be implemented.

According to one embodiment of the present invention, a conventional polyethylene terephthalate resin can be used as the polyethylene terephthalate resin without particular limitation.

The polyethylene terephthalate resin can have a repeat unit represented by Chemical Formula 2 below as a basic structure.

[Chemical Formula 2]

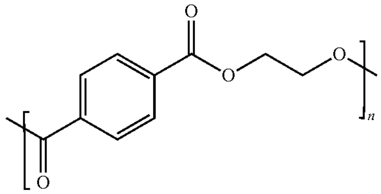

In Chemical Formula, n' represents an average degree of polymerization ranging from 40 to 160.

In one embodiment of the present invention, to increase the impact strength of the polyester resin composition, a copolymer obtained by copolymerizing the polyethylene terephthalate resin and an impact improving compound such as polytetramethylene glycol, polyethylene glycol, polypropylene glycol, aliphatic polyester, or aliphatic polyamide, a modified polyethylene terephthalate resin obtained by mixing the polyethylene terephthalate resin and the impact improving compound, or a co-polyethylene terephthalate resin polymer including the impact improving compound or an environmentally friendly compound as comonomers can be used. For example, the comonomer can be 1,4-cyclohexanedimethanol or isophthalic acid.

In one embodiment of the present invention, considering the processability and mechanical properties of the polyethylene terephthalate resin, the polyethylene terephthalate resin has an intrinsic viscosity (IV, η) of 0.5 to 1 dl/g, preferably 0.6 to 1.0 dl/g as measured according to ASTM D2857. When the intrinsic viscosity of the polyethylene terephthalate resin is within this range, a polyester resin composition having improved injection properties can be obtained.

For example, the polyethylene terephthalate resin can have a weight average molecular weight of 5,000 to 80,000 g/mol or 10,000 to 60,000 g/mol. Within this range, hydrolysis resistance and injection deviation can be improved.

In one embodiment of the present invention, based on a total weight of the polyester resin composition, the polyethylene terephthalate resin can be included in an amount of 10 to 37.5% by weight, 10 to 35% by weight, 15 to 37.5% by weight, or 15 to 25% by weight. Within this range, the mechanical properties of the polyester-based composition can be improved, and the injection properties thereof can be excellent.

As a method of preparing the polyethylene terephthalate resin, a polymerization method commonly practiced in the art to which the present invention pertains can be used without particular limitation. When a commercially available polyethylene terephthalate resin meets the definition of polyethylene terephthalate resin according to the present invention, the commercially available polyethylene terephthalate resin can be used in the present invention.

As a specific example, as the polyethylene terephthalate resin, a resin obtained by processing waste mineral water bottles can be used.

The resin obtained by processing waste mineral water bottles is a resin including polyethylene terephthalate, and can be polyethylene terephthalate prepared by condensation polymerization of terephthalic acid and ethylene glycol, but the present invention is not limited thereto.

In one embodiment of the present invention, for example, the recycled resin can be a white chip or a green chip obtained by flake-processing PET bottles according to the process flowchart of FIG. 1 to be described later.

FIG. 1 below is a process flowchart for explaining a process of preparing a recycled resin or a polyethylene terephthalate resin used in an embodiment to be described later.

Referring to FIG. 1 below, a sorting process is performed to classify waste mineral water bottles into colored bottles and transparent bottles. In this case, the sorting can be performed by visual observation, and the color can be predominantly green.

Next, pulverization is performed using a cutter. Specifically, first, bottles weighing around 200 kg are cleaned. Then, considering the washing, drying, and flake processes, the bottles are preferably pulverized to a size of 3 to 5 mm, but the present invention is not limited thereto. Within this range, by increasing the surface area of the pulverized PET pieces, drying efficiency in the subsequent drying process can be increased, and uniform reaction between a thickener and the pulverized pieces can be ensured.

Next, the pulverized pieces are further cleaned, followed by drying and flake processing.

The drying can be performed after a preliminary drying step of obtaining a PET reaction mixture by removing moisture from the pulverized pieces and mixing the pulverized pieces and a thickener.

In the preliminary drying step, drying is performed under temperature conditions of 120 to 140° C. so that the water content of the pulverized PET pieces is about 1,000 ppm, and a thickener and the pulverized PET pieces are mixed evenly for uniform reaction.

For example, in the preliminary drying step, the sorted pulverized PET pieces and the thickener are put into a friction dryer, and the pulverized PET pieces are dried at a dryer temperature of 140° C. and an agitator speed of 50 rpm for about 2 hours while continuously passing 120 to 140° C. high-temperature air through the dryer so that the water content of the pulverized PET pieces is 1,000 ppm.

As the thickener, a compound that causes thickening reaction without melting at around 140° C., which is a dryer temperature, and 165° C., which is a dryer temperature described later, can be used without limitation. As a specific example, a carbodiimide-based thickener can be used.

The carbodiimide-based thickener is a known compound, and examples of the carbodiimide-based thickener include carbodiimides and polycarbodiimides. The content of the thickener is appropriately adjusted according to intrinsic viscosity suitable for a desired product. For example, based on the total weight of PET, the thickener can be added in an amount of 0.25 to 0.75% by weight.

The dehumidification treatment is performed to prevent hydrolysis of PET in the reaction mixture. Specifically, the dehumidification treatment is a process of obtaining dried PET by performing drying and dehumidification so that the water content of the PET reaction mixture is less than 50 ppm.

According to the dehumidification process, the PET reaction mixture is put into a drying hopper, and hot air dehumidified in a dehumidifier is injected into the hopper under the conditions of a dryer temperature of 165° C., a dew point of −60 to −40° C., and a residence time of about 5 hours to perform drying and dehumidification. This process is performed until the water content of the PET reaction mixture is less than 50 rpm.

The flake processing is performed under conditions of about 5 mm using an optical flake sorter.

Then, extrusion is performed at a temperature range of 200 to 270° C. to obtain pelletized chips.

Specifically, the extrusion is a process of obtaining a PET melt product by mixing dried and dehumidified PET flakes having a water content of less than 50 ppm with a thickener, performing melt extrusion at a melting temperature, and physically removing foreign substances from the melt product.

Since the additionally added thickener has a lower melting temperature than the above-mentioned thickener, the thickener can not be used because the thickener is melted at the dryer temperature of 140° C. and the dryer temperature of 165° C. in the process to be described later.

For reference, when the additional thickener and the aforementioned thickener are added at the same time, the thickener melts in the dryer, and thus the pre-drying process and the dehumidification process can not be performed. Accordingly, the thickener is added during the extrusion process in which the PET reaction mixture is melted.

As the additional thickener, compounds known as oxazoline-based thickeners can be used. For example, oxazoline, 1,3-phenylene bisoxazoline, and the like can be used. For example, based on a total weight of the PET melt product, the thickener can be added in an amount of 0.1 to 0.75% by weight.

In addition, in the preliminary drying step, by properly adjusting the mixing ratio of the thickener in the extrusion process, recycled PET chips having intrinsic viscosity suitable for manufacturing a desired product can be obtained.

For example, according to the extrusion process, dried and dehumidified PET matter having a water content of less than 50 ppm and the above-mentioned additional thickener are introduced into an extruder, melt extrusion is performed at a melt temperature of 275 to 280° C. under a maximum melt pressure of 110 bar, and the melted extrudate is passed through a 20 micron SUS filter at a vacuum degree of 10 m bar to remove foreign substances to obtain a high-purity PET melt product.

The PET melt product obtained through the extrusion process is cut while being cooled to obtain a certain type of PET chip.

According to the molding process, the PET melt product discharged from a filter is cut by a pelletizer into spherical PET chips with a diameter of 2.8 mm in circulating water at 90° C. at a die plate temperature of 320° C. and a blade rotation speed of 3,200 rpm.

For reference, in the recycled PET chip manufacturing process, a recycled PET chip having a desired intrinsic viscosity and high purity is obtained by crystallizing the surface of the PET chip using residual heat of the PET chip manufactured in the molding process. Accordingly, since the PET chip produced in the molding process must have residual heat of 140° C. or higher for surface crystallization, the temperature conditions of molding must be properly controlled for crystallization.

In the recycled PET chip manufacturing process, the PET chip molded into a chip shape has crystallinity in the process of passing through an in-line crystallizer equipped with a vibrating conveyor while staying for about 15 minutes.

The reason why the surface of the recycled PET chips is crystallized is that when PET chips are finally used as a raw material, energy saving effect is provided by omitting surface crystallization, which is essential during PET drying. At this time, when a raw material whose surface is not crystallized is dried immediately, the raw material is entangled and clumped together, which makes it impossible to transfer or input the raw material.

When necessary, the obtained recycled PET chips are compounded with talc, a coupling agent, or glass fiber to obtain a recycled resin.

Based on a total weight of the polyester resin composition, the resin obtained by processing waste mineral water bottles can be included in an amount of 10 to 37.5% by weight, 10 to 35% by weight, 15 to 37.5% by weight, or 15 to 25% by weight. Within this range, by controlling the content of the recycled resin, the mechanical properties of the polyester-based composition can be improved, and a polyester resin composition having excellent balance with injection properties can be obtained.

Glass Fiber

In one embodiment of the present invention, by including glass fiber in the polyester resin composition, the physical properties of a molded article manufactured using the polyester resin composition can be improved. Specifically, the tensile strength and flexural strength of the molded article can be improved.

According to one embodiment of the present invention, the glass fiber can be used in combination with other inorganic fiber. For example, the inorganic fiber can include one or more selected from carbon fiber, basalt fiber; and natural fiber such as kenaf or hemp.

In one embodiment of the present invention, the cross section of the glass fiber can have a circular, rectangular, elliptical, dumbbell, or rhombic shape, and the glass fiber can have an average diameter of 7 to 20 μm or 7 to 15 μm and an average length of 2 to 6 mm or 3 to 6 mm. When the average diameter and the average length satisfy the above-mentioned ranges, excellent injection properties and physical property balance can be implemented.

The average diameter and average length of the glass fiber can be measured by methods commonly used in the art. For example, 30 strands of glass fiber can be observed using a scanning electron microscope (SEM), and an average value can be calculated based on the observation results.

During fiber manufacturing or post-processing, the glass fiber can be treated with a sizing agent. Examples of the sizing agent include a lubricant, a coupling agent, and a surfactant.

The lubricant is mainly used to form a good strand, and the coupling agent plays a role in enabling good adhesion between glass fiber and a polybutylene terephthalate resin or a polyethylene terephthalate resin. When the types of the polybutylene terephthalate resin, the polyethylene terephthalate resin, and the glass fiber are properly selected and used, excellent physical properties can be imparted to the polyester resin composition.

The coupling agent can be applied directly to the glass fiber or added to polybutylene terephthalate resin or the polyethylene terephthalate resin. To sufficiently exhibit the performance of the coupling agent, the content thereof can be appropriately selected. For example, based on 100% by weight in total (glass fiber+coupling agent) of the glass fiber, the coupling agent can be included in an amount of 0.1 to 10% by weight, 0.1 to 5% by weight, or 0.1 to 3% by weight.

Examples of the coupling agent include amine-based coupling agents, acrylic coupling agents, and silane-based coupling agents such as γ-aminopropyltriethoxysilane, γ-aminopropyltrimethoxysilane, N-(beta-aminoethyl)

γ-aminopropyltriethoxysilane, γ-methacryloxypropyl triethoxysilane, γ-glycidoxypropyl trimethoxysilane, and β(3, 4-epoxyethyl) γ-aminopropyl trimethoxysilane.

In particular, to obtain rigidity and mechanical properties, the glass fiber of the present invention preferably contains calcium oxide in a predetermined amount.

For example, the calcium oxide can be included in a high content of 35.6 to 60% by weight or a low content of 13 to 24% by weight in the glass fiber.

For reference, when the calcium oxide is included in an amount of greater than 24% by weight and less than 35.6% by weight, for example, an amount of 25 to 35% by weight, as shown in Comparative Examples 1 to 3 to be described later, mechanical properties including Izod impact strength are poor.

As a specific example, when the glass fiber includes a high content of the calcium oxide, the calcium oxide can be included in an amount of 35.6 to 58% by weight, preferably 35.6 to 55% by weight. Within this range, by adjusting the content of the glass fiber, the impact resistance and mechanical properties of the polyester-based composition can be improved. When the calcium oxide is included in an amount less than the range, the effect of adding glass fiber on heat resistance and mechanical properties can be insignificant. When the calcium oxide is included in an amount exceeding the range, surface gloss can be greatly reduced.

As a specific example, when the glass fiber includes a low content of the calcium oxide, the calcium oxide can be included in an amount of 13 to 22% by weight, preferably 13 to 20% by weight. Within this range, by adjusting the content of the glass fiber, the impact resistance and mechanical properties of the polyester-based composition can be improved. When the calcium oxide is included in an amount less than the range, the effect of adding glass fiber on heat resistance and mechanical properties can be insignificant. When the calcium oxide is included in an amount exceeding the range, surface gloss can be greatly reduced.

In addition, for example, aluminum oxide can be included in the glass fiber in an amount of 1 to 40% by weight or 5 to 30% by weight.

In addition, for example, silica can be included in the glass fiber in an amount of 20 to 60% by weight, 30 to 50% by weight, or 40 to 50% by weight.

In addition, one or more selected from iron oxide, magnesia, sodium oxide, iron, and boron oxide can be included in the glass fiber in an amount of 5% by weight or less or 0.001 to 5% by weight.

In one embodiment of the present invention, based on a total weight of components constituting the composition, the glass fiber can be included in an amount of 10 to 43% by weight, 10 to 40% by weight, 15 to 40% by weight, 25 to 45% by weight, 10 to 40% by weight, or 10 to 35% by weight. Within this range, the mechanical properties, such as dimensional, and heat resistance of a molded article manufactured using the polyester resin composition can be improved.

When the glass fiber containing a high content of the calcium oxide is used, based on a total weight of components constituting the composition, the glass fiber is preferably included in an amount of 10 to 43% by weight, 10 to 40% by weight, 15 to 40% by weight, 25 to 45% by weight, 10 to 40% by weight, 10 to 35% by weight, 10 to 31% by weight, or 25 to 35% by weight. On the other hand, when the glass fiber containing a low content of the calcium oxide is used, based on a total weight of components constituting the composition, the glass fiber is preferably included in an amount of 10 to 35% by weight, 15 to 35% by weight, 20 to 35% by weight, 25 to 35% by weight, or 30 to 35% by weight.

When the glass fiber content is adjusted to the above range according to the calcium content, the mechanical properties, such as dimensional stability, and heat resistance of a molded article manufactured using the polyester resin composition can be improved.

<Polyester Resin Composition>

The polyester resin composition according to the present invention can include the polybutylene terephthalate resin and the polyethylene terephthalate resin in a weight ratio (PBT:PET) of 1:0.7 to 1:3. Within this range, hydrolysis resistance and injection deviation can be improved.

For example, the polybutylene terephthalate resin and the polyethylene terephthalate resin can be included in a weight ratio (PBT:PET) of 1:0.7 to 1:3, preferably 1:0.75 to 1:2. Within this range, hydrolysis resistance and the deviation of an injection specimen can be improved. When the polybutylene terephthalate resin and the polyethylene terephthalate resin are included in a weight ratio less than the range, injection properties can be poor. When the polybutylene terephthalate resin and the polyethylene terephthalate resin are included in a weight ratio exceeding the range, due to high crystallization temperature, injection molding can be poor.

When the polyethylene terephthalate resin is a resin obtained by processing mineral water bottles, eco-friendliness can be improved.

The resin obtained by processing mineral water bottles can be obtained by subjecting waste mineral water bottle pellets to flake processing and chip molding.

The resin obtained by processing waste mineral water bottles can be a recycled resin obtained through flake processing.

The polyester resin composition according to the present invention can include one or more additives selected from the group consisting of a lubricant, a transesterification inhibitor, an antioxidant, a heat stabilizer, a flame retardant, a flame retardant aid, a colorant, a release agent, a pigment, a dye, an antistatic agent, an antibacterial agent, a processing aid, a metal deactivator, a smoke suppressant, a fluorine-based anti-drip agent, an anti-friction agent, an anti-wear agent, and a coupling agent.

In one embodiment of the present invention, the additives can be included in the composition in an amount of 0.1 to 10% by weight, preferably 0.1 to 5% by weight. Within this range, the properties of the additives can be effectively expressed without affecting the physical properties of the resin composition.

The lubricant can be olefin-based wax, and serves to help the polyester resin composition maintain excellent releasability and injection properties.

The olefin-based wax can be a polymer having a low melt viscosity and can be an oily solid having sliding properties and plasticity. For example, the olefin-based wax can include at least one selected from polyethylene wax and polypropylene wax, and commercially available olefin wax can be used.

In one embodiment of the present invention, for example, the lubricant can be included in the composition in an amount of 0.001 to 3% by weight, preferably 0.01 to 2% by weight. Within this range, excellent releasability and injection properties can be achieved.

In one embodiment of the present invention, various known hydrolysis suppressors can be used as the hydrolysis suppressor within the range that does not adversely affect the polyester resin composition of the present invention. Representative commercially available hydrolysis suppressors include phosphate compounds such as sodium phosphate monobasic represented by Chemical Formula of $NaH_2PO_4$.

In one embodiment of the present invention, for example, the hydrolysis suppressor can be included in the composition in an amount of 0.001 to 3% by weight, preferably 0.01 to 2% by weight. Within this range, excellent hydrolysis resistance and stability can be achieved.

The antioxidant can include a phenolic antioxidant. As described above, by using a phenolic antioxidant, polymers included in the polyester-based composition can be further stabilized. Specifically, when molding the polyester-based composition, the phenolic antioxidant can protect the composition by removing radicals of polymers included in the polyester-based composition. In the present invention, Hindered Phenolic Antioxidant 1010 can be used as the phenolic antioxidant.

The antioxidant can be included in the composition in an amount of 0.001 to 1% by weight. More specifically, based on 100% by weight in total of the components constituting the composition, the antioxidant can be included in an amount of 0.002 to 0.7% by weight or 0.002 to 0.5% by weight.

When the content of the antioxidant included in the polyester-based composition is adjusted within the above-described range, discoloration of the polyester-based composition can be prevented. In addition, by adjusting the content of the antioxidant within the above-described range, the molecular chains of polymers included in the polyester-based composition can be prevented from being cut or crosslinked by oxidation, thereby effectively suppressing deterioration of physical properties.

As the heat stabilizer, a phenolic heat stabilizer can be used. Specifically, the phenolic heat stabilizer can be pentaerythritol tetrakis (3-(3,5-di-tert-butyl-4-hydroxyphenyl) propionate).

Specifically, the heat stabilizer can be included in the composition in an amount of 0.001 to 3% by weight or 0.002 to 2.5% by weight. Within this range, by adjusting the content of the heat stabilizer, impact strength can be excellent, and heat deflection temperature can be increased while maintaining the deviation of the left and right values of the heat deflection temperature below 3° C. Thus, heat resistance can be excellent, and melt flow index can be reduced.

The polyester resin composition can include a plasticizer such as glycerol to control crystallization by increasing the point of a crystal nucleus.

Specifically, the plasticizer can be included in the composition in an amount of 0.001 to 3% by weight or 0.002 to 2.5% by weight. Within this range, by adjusting the content of the plasticizer, chain folding can be facilitated during crystal formation.

The polyester resin composition can be a polyester resin composition for motor insulator parts used inside a refrigerator.

For example, the polyester resin composition can have a flexural strength of 1, 700 kgf/cm$^2$ or more and a flexural modulus of 70,000 kgf/cm$^2$ or more, as a specific example, a flexural strength of 1,800 to 2,020 kgf/cm$^2$ and a flexural modulus of 73,000 to 110,000 kgf/cm$^2$, preferably 75,000 to 105,000 kgf/cm$^2$ as measured at a span of 50 and a speed of 1.3 mm/min using a ⅛-inch molded article specimen according to ASTM D790. Within this range, excellent injection properties and mechanical properties such as Izod impact strength can be achieved.

For example, when Izod impact strength is measured at 23° C. using a notched specimen according to ASTM D256 and heat deflection temperature is measured under a load of 18.6 kg according to ASTM D648, the polyester resin composition can have an Izod impact strength of 7.0 kgf·cm/cm or more and a heat deflection temperature of 200° C. or higher, as a specific example, an Izod impact strength of 7.1 to 7.9 kgf·cm/cm and a heat deflection temperature of 201 to 210° C., preferably an Izod impact strength of 7.1 to 7.7 kgf·cm/cm and a heat deflection temperature of 201 to 209° C. Within this range, excellent injection properties and mechanical properties such as Izod impact strength can be achieved.

<Method of Preparing Polyester Resin Composition >

The polyester resin composition according to the present invention can be prepared by a method known in the art. For example, the polyester resin composition can be prepared in the form of pellets by a method of melt-extruding a mixture of components and additives in an extruder, and the pellets can be used to manufacture injection-molded articles and extrusion-molded articles.

In one embodiment of the present invention, the pellets are extruded at a temperature of 240 to 300° C. or 250 to 290° C. At this time, the temperature means temperature set in a cylinder.

Extrusion kneaders commonly used in the art to which the present invention pertains can be used without particular limitation, and a twin-screw extrusion kneader is preferably used.

In addition, when injecting pellets, the temperature of a mold is preferably 40 to 120° C. When the mold temperature is 40° C. or less, appearance can be deteriorated. When the mold temperature is 120° C. or higher, the pellets can stick to the mold, reducing releasability and increasing cooling rate. Specifically, the mold temperature can be 60 to 88° C., 70 to 80° C., or 72 to 78° C. Within this range, even when the temperature of a mold into which a melt product containing the polyester-based composition is injected is controlled during injection molding, injection deviation at all points of the molded article can be minimized, thereby improving injection properties and hydrolysis resistance.

For example, the injection process can be performed using an injection machine in which hopper temperature or nozzle temperature is set to 230 to 260° C.

According to one embodiment of the present invention, when the injection-molded article is manufactured through injection molding, the injection speed of a melt product containing the polyester resin composition can be 30 to 100 mm/s. Specifically, when the injection-molded article is manufactured through injection molding, the injection speed of a melt product containing the polyester resin composition can be 35 to 95 mm/s, 50 to 80 mm/s, or 60 to 70 mm/s. Within this range, when an injection-molded article is manufactured through injection molding, even when the temperature of a mold into which a melt product containing the polyester-based composition is injected is adjusted, injection deviation at all points of the molded article can be minimized, thereby improving injection properties and hydrolysis resistance.

For example, the method of preparing a polyester resin composition according to the present invention includes a step of kneading and extruding a polyester resin composition including a polybutylene terephthalate resin, a polyethylene terephthalate resin, glass fiber, and additives. The polyethylene terephthalate resin is a resin obtained by processing mineral water bottles. In this case, the physical property balance between rigidity, processability, and specific gravity can be excellent.

The resin obtained by processing mineral water bottles can be obtained by subjecting waste mineral water bottle pellets having an intrinsic viscosity of 0.5 to 1.0 dl/g to flake processing and chip molding.

According to one embodiment of the present invention, the method of preparing a polyester resin composition can include a step of obtaining waste mineral water bottle pellets by subjecting waste polyester mineral water bottles having an intrinsic viscosity of 0.5 to 1.0 dl/g to flake processing and manufacturing a recycled molded article by subjecting the obtained waste mineral water bottle pellets to chip molding; and a step of melt-kneading and extruding 10 to 37.5% by weight of the recycled molded article, 26.7 to 54% by weight of a polybutylene terephthalate resin, and 10 to 43% by weight of glass fiber.

As a specific example, the method of preparing a polyester resin composition can include a step of obtaining waste mineral water bottle pellets by subjecting waste polyester mineral water bottles having an intrinsic viscosity of 0.5 to 1.0 dl/g to flake processing and manufacturing a recycled molded article by subjecting the obtained waste mineral water bottle pellets to chip molding; and a step of melt-kneading and extruding 10 to 37.5% by weight of the recycled molded article, 26.7 to 54% by weight of a polybutylene terephthalate resin having an intrinsic viscosity of 0.6 to 1.5, and 10 to 43% by weight of glass fiber.

<Molded Article>

The thermoplastic resin composition of the present invention can be used as a material for molded articles requiring excellent mechanical properties, such as dimensional stability, heat resistance, and injection properties.

The thermoplastic resin composition of the present invention can be applied to various products requiring heat resistance and injection properties.

According to another embodiment of the present invention, a molded article manufactured using the above-described thermoplastic resin composition is provided.

For example, the molded article can be a home appliance part having high heat resistance and excellent injection properties.

As another example, the molded article can be a refrigerator motor insulator.

For example, the molded article can have a flexural strength of 1,700 $kgf/cm^2$ or more, preferably 1,800 to 2,020 $kgf/cm^2$ as measured at a span of 50 and a speed of 1.3 mm/min using a ⅛-inch specimen according to ASTM D790.

In addition, the molded article can have a flexural modulus of 70,000 $kgf/cm^2$ or more, as a specific example, 73,000 to 110,000 $kgf/cm^2$, preferably 75,000 to 105,000 $kgf/cm^2$ as measured at a span of 50 and a speed of 1.3 mm/min using a ⅛-inch specimen according to ASTM D790.

In addition, for example, the molded article can have an Izod impact strength of 7.0 kgf·cm/cm or more, as a specific example, 7.1 to 7.9 kgf·cm/cm, preferably 7.1 to 7.7 kgf·cm/cm as measured at 23° C. using a notched specimen according to ASTM D256.

In addition, the molded article can have a heat deflection temperature of 200° C. or higher, as a specific example, 201 to 210° C., preferably 201 to 209° C. as measured under a load of 18.6 kg according to ASTM D648.

Accordingly, the thermoplastic resin composition of the present invention can be used as a material for molded articles requiring excellent moldability, heat resistance, and dimensional stability.

In addition, in describing the polyester resin composition, the method of preparing the same, and the molded article including the same according to the present invention, it should be noted that other conditions or equipment not explicitly described herein can be appropriately selected within the range commonly practiced in the art without particular limitation.

Hereinafter, examples of the present invention will be described in detail so that those skilled in the art to which the present invention pertains can easily practice the present invention. However, the present invention can be implemented in various different forms and is not limited to these embodiments.

EXAMPLES

Polybutylene terephthalate, polyethylene terephthalate, a recycled resin, a lubricant, a hydrolysis suppressor, and an antioxidant used in examples of the present invention and comparative examples are as follows. Here, % means % by weight.

(A) Polybutylene terephthalate resin (PBT: 0.8 dl/g)

(B) Polyethylene terephthalate resin (PET: homopolymer, 0.8 dl/g)

(B1) Virgin PET (B2) Recycled resin: White chips (right image of FIG. 2) obtained by processing waste mineral water bottles according to the flowchart shown in FIG. 1

(C) Glass fiber (Average diameter: 7 to 15 μm, average length: 3 to 6 mm)

(C1) Glass fiber 1 (silica: 48 wt %, aluminum oxide: 12 wt %, calcium oxide: 35 wt %, and other components: 6 wt %)

(C2) Glass fiber 2 (silica: 44 wt %, aluminum oxide: 14 wt %, calcium oxide: 36 wt %, and other components: 6 wt %)

(C3) Glass fiber 3 (silica: 52 wt %, aluminum oxide: 18 wt %, calcium oxide: 16 wt %, and other components: 14 wt %)

(D) Lubricant (polyethylene wax) LDPE wax (E) Hydrolysis suppressor (transesterification inhibitor): Sodium phosphate monobasic represented by Chemical Formula of $NaH_2PO_4$ (F) Phenolic antioxidant (Product name: pentaerythritol tetrakis (3-(3,5-di-tert-butyl-4-hydroxypehnyl) propionate))

Examples 1 to 4 and Comparative Examples 1 to 5

Each component was added according to the amounts shown in Table 1, and melt-kneading was performed in the temperature range of 250 to 290° C. using a twin-screw extruder with L/D=42 and Φ=40 mm to obtain a resin composition in pellet form. For reference, 0.4% by weight of an antioxidant, 0.3% by weight of a lubricant, and 0.1% by weight of a hydrolysis suppressor were added.

After drying the prepared pellets at 100° C. for more than 4 hours, the dried pellets were injected at an injection temperature of 260 to 290° C., a mold temperature of 60° C., and an injection speed of 30 mm/s using an 80-ton injection machine (Victory 80, Engel Co.) to prepare a specimen for mechanical property evaluation. The physical properties of the prepared specimen with a thickness of 3.2 mm, a width of 12.7 mm, and a marked line section (elongation measurement) of 115 mm were measured in the following manner, and the results are shown in Table 2 below.

Melt flow index (Unit: g/10 min): Melt flow index was measured at 260° C. under a load of 2.16 kg according to ASTM D1238.

Tensile strength (Unit: $kgf/cm^2$) and elongation (Unit: %): Tensile strength and elongation were measured at a speed of 5 mm/min according to ASTM D638.

Flexural strength (Unit: $kgf/cm^2$) and flexural modulus (Unit: $kgf/cm^2$): Flexural strength and flexural modulus were measured at a span of 50 and a speed of 1.3 mm/min according to ASTM D790. At this time, a ⅛-inch specimen was used.

Izod impact strength (Unit: kgf·cm/cm): Izod impact strength was measured according to ASTM D256 (Notched, room temperature of 23° C.).

Heat deflection temperature (Unit:° C.): Heat deflection temperature was measured under a high load of 18.6 kg according to ASTM D648.

glass fiber with a calcium content outside the range of the present invention is included, melt flow index is poor.

In addition, in the case of Comparative Example 2 including glass fiber with a calcium content outside the range of the present invention, melt flow index and impact strength are reduced. In the case of Comparative Example 3 including an excess of the resin obtained by processing waste mineral water bottles, impact strength is very low.

In addition, in the case of Comparative Examples 4 and 5 in which an excess of glass fiber is used even though the calcium content of the glass fiber is within the range of the present invention, depending on the amount of polybutylene terephthalate used, flexural strength decreases. In addition, flexural modulus, heat deflection temperature, and impact strength are reduced.

In addition, when a specimen was prepared by the same procedure as Example 1, except that the polyethylene terephthalate of the resin (B2) obtained by processing waste mineral water bottles was replaced by the virgin PET (B1) and the glass fiber 3 (C3) was replaced by the glass fiber 1

TABLE 1

| Classification | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| A | 48.4 | 32.6 | 30.6 | 48.4 | 69.2 | 48.4 | 22.6 | 46.4 | 32.6 |
| B2 | 20.8 | 34.6 | 34.6 | 20.8 | | 20.8 | 42.6 | 20.8 | 34.6 |
| C1 | | | | | 30 | 30 | | | |
| C2 | | | | 30 | | | 34 | 32 | 32 |
| C3 | 30 | 32 | 34 | | | | | | |
| D | 0.3 | 0.3 | 0.3 | 0.3 | 0.3 | 0.3 | 0.3 | 0.3 | 0.3 |
| E | 0.1 | 0.1 | 0.1 | 0.1 | 0.1 | 0.1 | 0.1 | 0.1 | 0.1 |
| F | 0.4 | 0.4 | 0.4 | 0.4 | 0.4 | 0.4 | 0.4 | 0.4 | 0.4 |

TABLE 2

| Classification | Unit | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Melt flow index | g/min | 21.0 | 18.6 | 17.1 | 26.7 | 28.8 | 38.5 | 21.1 | 24.0 | 74.0 |
| Tensile strength | $kgf/cm^2$ | 1465 | 1455 | 1450 | 1290 | 1290 | 1240 | 1375 | 1400 | 1475 |
| Elongation | % | 2.5 | 2.3 | 2.7 | 2.4 | 3.6 | 3.2 | 2.5 | 3.3 | 2.7 |
| Flexural strength | $kgf/cm^2$ | 2110 | 2030 | 2070 | 1925 | 1865 | 1825 | 1800 | 1645 | 1785 |
| Flexural modulus | $kgf/cm^2$ | 90900 | 97000 | 102000 | 77650 | 74050 | 74450 | 88650 | 84150 | 82900 |
| Impact strength | kgf · cm/cm | 7.7 | 7.7 | 7.6 | 7.1 | 7.5 | 6.1 | 6.4 | 7.2 | 6.8 |
| Heat deflection temperature | ° C. | 207 | 205 | 207 | 202 | 209 | 204 | 201 | 206 | 200 |

As shown in Tables 1 and 2, Examples 1 to 4 including the polybutylene terephthalate, the recycled resin obtained by subjecting waste mineral water bottles to flake processing, and the glass fiber as essential components according to the present invention in a predetermined content ratio exhibit a melt flow index of 17.1 to 26.7 g/10 min, a tensile strength of 1,290 to 1,465 $kgf/cm^2$, a tensile elongation of 2.3 to 2.8%, a flexural strength of 1,925 to 2,110 $kgf/cm^2$, a flexural modulus of 77, 650 to 102, 000 $kgf/cm^2$, an Izod impact strength of 7.1 to 7.7 kgf·cm/cm, a heat deflection temperature of 202 to 207° C. Based on these results, in Examples 1 to 4, it can be confirmed that physical property balance between dimensional stability, heat resistance, and specific gravity is excellent.

On the other hand, in the case of Comparative Example 1 in which the polyethylene terephthalate is not included and (C1), and then the physical properties of the specimen were measured according to the same methods, the specimen exhibited a melt flow index of 24.8 g/10 min, a tensile strength of 1,330 $kgf/cm^2$, a tensile elongation of 3.5%, a flexural strength of 1,980 $kgf/cm^2$, a flexural modulus of 79,950 $kgf/cm^2$, an impact strength of 7.3 kgf·cm/cm, and a heat deflection temperature of 206° C. Based on these results, it can be seen that the specimen has physical properties similar to those of Examples 1 to 4.

In conclusion, although an inexpensive PBT material and a recycled PET material having high crystallization temperature and unstable mechanical properties such as dimensional stability are included, mechanical properties, particularly injection properties, similar to those of conventional PBT-reinforced resin compositions can be achieved, and eco-friendliness and heat resistance can be improved. Accordingly, the composition of the present invention is suitable for motor insulator parts for internal use that require dimensional stability, heat resistance, and injection properties.

The invention claimed is:

1. A polyester resin composition, comprising, based on 100% by weight in total of the components constituting the polyester resin composition:

a polybutylene terephthalate resin in an amount of 26.7 to 54% by weight based on the total weight of the composition;

a polyethylene terephthalate resin in an amount of 10 to 37.5% by weight based on the total weight of the composition; and glass fiber in an amount of 10 to 31% by weight based on the total weight of the composition, wherein the glass fiber comprises calcium oxide in an amount of 35.6 to 60% by weight based on the total weight of the glass fiber.

2. The polyester resin composition according to claim 1, wherein the polyethylene terephthalate resin is a resin obtained by processing mineral water bottles.

3. The polyester resin composition according to claim 1, wherein the polyethylene terephthalate resin has an intrinsic viscosity of 0.5 to 1.0 as measured according to ASTM D2857.

4. The polyester resin composition according to claim 1, wherein the polybutylene terephthalate resin has an intrinsic viscosity of 0.6 to 1.8 as measured according to ASTM D2857.

5. The polyester resin composition according to claim 1, wherein the polyester resin composition comprises one or more additives selected from the group consisting of a lubricant, a transesterification inhibitor, an antioxidant, a heat stabilizer, a flame retardant, a flame retardant aid, a colorant, a release agent, a pigment, a dye, an antistatic agent, an antibacterial agent, a processing aid, a metal deactivator, a smoke suppressant, a fluorine-based anti-drip agent, an anti-friction agent, an anti-wear agent, and a coupling agent.

6. The polyester resin composition according to claim 1, wherein the polyester resin composition has a flexural strength, Izod impact strength, and heat deflection temperature suitable for a refrigerator motor insulator part.

7. The polyester resin composition according to claim 1, wherein the polyester resin composition has a flexural strength of 1,700 $kgf/cm^2$ or more, and a flexural modulus of 70,000 $kgf/cm^2$ or more as measured at a span of 50 and a speed of 1.3 mm/min using a ⅛-inch molded article specimen according to ASTM D790.

8. The polyester resin composition according to claim 1, wherein the polyester resin composition has an Izod impact strength of 7.0 kgf·cm/cm or more as measured at 23° C. using a notched specimen according to ASTM D256, and has a heat deflection temperature of 200° C. or higher as measured under a load of 18.6 kg according to ASTM D648.

9. A molded article, comprising the polyester resin composition according to claim 1.

10. The molded article according to claim 9, wherein the molded article is a motor insulator part for internal use.

11. The molded article of claim 9, wherein the molded article is a refrigerator motor insulator.

12. A molded article, comprising the polyester resin composition according to claim 2.

13. A molded article, comprising the polyester resin composition according to claim 3.

14. A molded article, comprising the polyester resin composition according to claim 4.

15. A molded article, comprising the polyester resin composition according to claim 5.

16. A molded article, comprising the polyester resin composition according to claim 7.

17. A molded article, comprising the polyester resin composition according to claim 8.

18. A method of preparing a polyester resin composition, comprising melt-kneading and extruding a composition comprising a polybutylene terephthalate resin in an amount of 26.7 to 54% by weight based on the total weight of the composition, a polyethylene terephthalate resin in an amount of 10 to 37.5% by weight based on the total weight of the composition, and glass fiber in an amount of 10 to 31% by weight based on the total weight of the composition, wherein the glass fiber comprises calcium oxide in an amount of 35.6 to 60% by weight based on the total weight of the glass fiber.

19. The method according to claim 18, wherein the extruding is performed at a temperature of 240 to 300° C.

* * * * *